Aug. 6, 1929. A. H. ROEHR 1,723,374
OIL CLEANER
Filed April 2, 1928

INVENTOR,
Alexander H. Roehr,
BY Howard D. Smith.
ATTORNEY.

Patented Aug. 6, 1929.

1,723,374

UNITED STATES PATENT OFFICE.

ALEXANDER H. ROEHR, OF DAYTON, OHIO.

OIL CLEANER.

Application filed April 2, 1928. Serial No. 266,636.

This invention relates to new and useful improvements in oil cleaners.

It is one of the principal objects of my invention to provide a compact and efficient cleaner for fluids such as oil, and more particularly for the oil which is used by the motor of an automobile. For this purpose I employ nested screens coated or covered with felt through which the oil under pressure flows.

It is another object of my invention to provide below the straining means, a sediment chamber for collecting the water, dirt and other foreign particles that the oil contains. The oil enters this chamber through the baffle plate at the top of it.

To prevent the liquid mass under this baffle plate from swirling, when under pressure, it is another object of my invention to provide vertically disposed means to arrest its circulatory motion, so that the sediment will more quickly and completely descend to the bottom of the chamber for removal.

Other important and incidental objects will be brought out in the following specification and particularly set forth in the subjoined claims.

Figure 1:
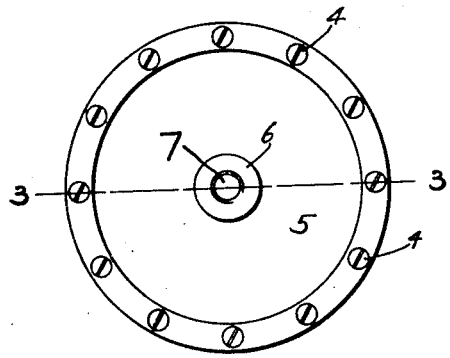
Figure 4:
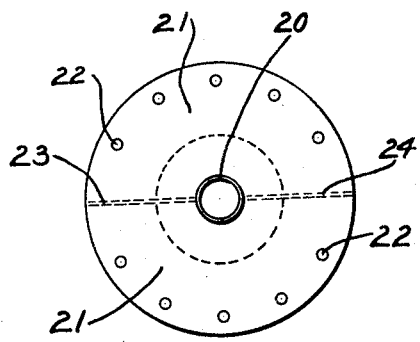
Figure 2:
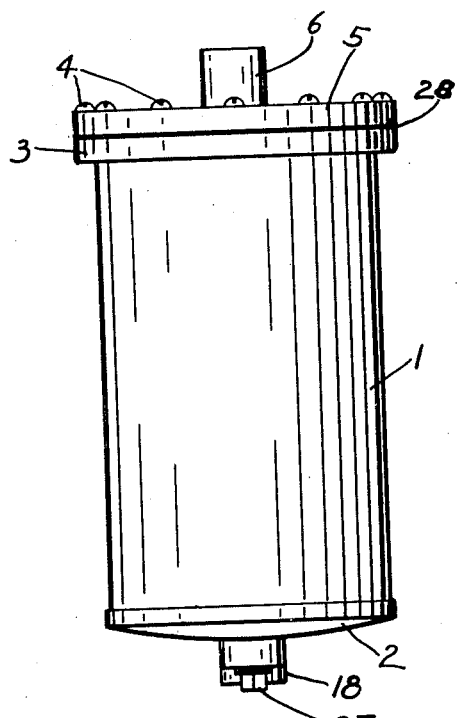
Figure 3:
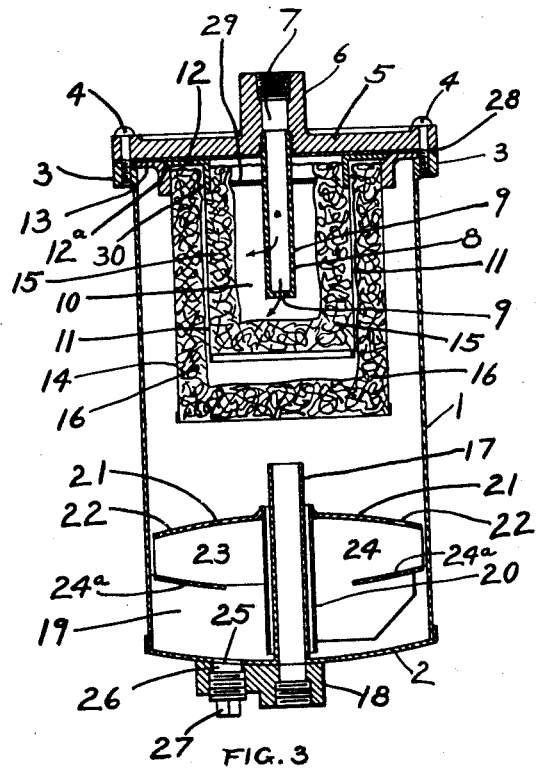

In the accompanying drawings illustrating my invention, Figure 1 is a top plan view of my oil cleaner. Figure 2 is a side view of the same. Figure 3 is a longitudinal sectional view taken through said cleaner, showing the oil straining means and the sediment chamber below. And Figure 4 is a top plan view of the perforated baffle plate.

Referring to the accompanying drawings for a detailed description of my invention, the numeral 1 designates a metal casing that is preferably of cylindrical form and provided with a bottom 2. Around its top periphery the casing 1 is formed with a flange 3 having axial screw holes to receive studs 4 by which a cover plate 5 is removably secured to the top of the casing.

Projecting upwardly from the middle portion of the cover plate 5 is a boss 6 having an axial bore 7 which projects down through the cover plate. The wall of this bore is internally threaded at its lower end to receive the upper threaded end of an inlet tube 8. The upper end of the boss 6 is internally threaded to receive an oil connection (not shown) through which oil or other fluid to be cleaned is delivered to the casing 1.

The tube 8 contains in its curved wall and bottom, holes 9 through which the fluid to be cleaned enters the space 10 within a cylindrical screen 11. The latter is provided with a flanged metal top 12 which seats on a shoulder 12ª formed on the inner surface of the flanged metal top 13 of an outer cylindrical screen 14. This flanged top 13 is placed in a recess in the top of the casing 1, after which the cover plate 5 is applied to it and the studs 4 screwed into the bosses 3 to tightly secure the plate and the screens to the casing. (See Figure 3.)

The inner screen 11 is preferably lined with felt 15 to assist the screen, which is of fine mesh, in straining the oil or other fluid that passes through it from the perforated tube 9. (See arrows in Figure 3.)

The outer screen 14, in which the inner screen 11 is nested, is also preferably lined with felt 16. After the oil or other fluid to be cleaned passes through both felt lined screens 11 and 14, it is thoroughly filtered or strained.

The strained oil leaves the casing 1 through a vertical tube 17 which is threaded at its lower end for insertion in a fitting 18 secured to the bottom 2 of said casing. (See Figures 2 and 3.)

In the lower part of the casing 1 is a sediment chamber 19 defined by the removable baffle plate assembly now to be described. Referring to Figures 2 and 3, the numeral 20 designates a metal sleeve which is adapted to be easily slipped over the tube 17. To the upper end of the sleeve 20 there is soldered or otherwise secured, a downwardly flaring baffle disc or plate 21. This plate contains small holes 22 through which the watery mass, heavier than the cleaned oil, descends.

This mass, which contains oil, water, dirt and other particles, usually is in violent circulatory motion when the oil enters the metal casing under pressure. In order to arrest the swirling of this mass, that the sediment may more quickly and completely settle to the bottom of the chamber, I provide vertically disposed webs or cross plates 23 and 24 that project radially from the sleeve 20 along the bottom surface of the baffle plate 21. The web 24 is wider than the web 23 and has a lower tapered outer edge that projects almost to the bottom of the casing 1. A short distance below the baffle plate 22 a dished ring member 24ª is secured to the webs 23 and 24. (See Figures 3 and 4.)

The assembly just described thoroughly baffles the liquid mass that descends to the bottom of the metal casing 1 and arrests its swirling motion. The water and foreign particles separated from the oil may be easily removed through a hole 25 in the tank bottom 2 and a communicating outlet passage 26 in the fitting 18. This passage is closed by a threaded plug 27.

For the purpose of tightly sealing the top of the metal casing 1, I provide a gasket 28 which is pressed against the flange 3 by the cover plate 5.

In order to tightly secure the felt 15 within the screen 11, I provide an expansible ring 29 which is horizontally disposed within the felt to press it outwardly against the curved wall of the screen. A similar ring 30 is provided within the felt 16 for the purpose of tightly pressing it against the curved wall of the outer screen 14. (See Figure 3.)

By unloosening the screws 4, the cover plate 5 may be easily taken off to permit the removal of the nested screens 11 and 14 as a unit. The baffle plate assembly may then be lifted out bodily for cleaning or repair. These parts may, with equal facility, be replaced in the metal casing.

Having described my invention, I claim:

1. A device of the type described, comprising in combination, a closed metal casing, a fluid inlet in the top thereof, a fluid outlet in the bottom of the same, straining means in the upper part of said casing in the path of the incoming fluid, a perforated transverse baffle plate below the straining means, an outlet tube projecting downwardly through said baffle plate to the fluid outlet, and vertical webs projecting radially from said outlet tube along the under surface of the baffle plate, for the purpose specified.

2. A device of the type described, comprising in combination, a closed metal casing, a fluid inlet in the top thereof, a vertical fluid outlet tube in the bottom of the same, straining means in the upper part of said casing in the path of the incoming fluid, a baffle plate assembly below said straining means, said assembly comprising a central outlet sleeve adapted to fit over said outlet tube, and a perforated baffle plate secured to the top portion of said sleeve.

3. A device of the type described, comprising in combination, a closed metal casing, a fluid inlet in the top thereof, a vertical fluid outlet tube in the bottom of the same, straining means in the upper part of said casing in the path of the incoming fluid, a baffle plate assembly below said straining means, said assembly comprising a central outlet sleeve adapted to fit over said outlet tube, a perforated baffle plate secured to the top portion of said sleeve, vertical webs projecting radially from said sleeve along the bottom surface of said baffle plate, and a flat baffle ring encircling said sleeve below the baffle plate and secured to the outer ends of said webs.

In testimony whereof I have hereunto set my hand this 31st day of March, 1928.

ALEXANDER H. ROEHR.